Figure 1:
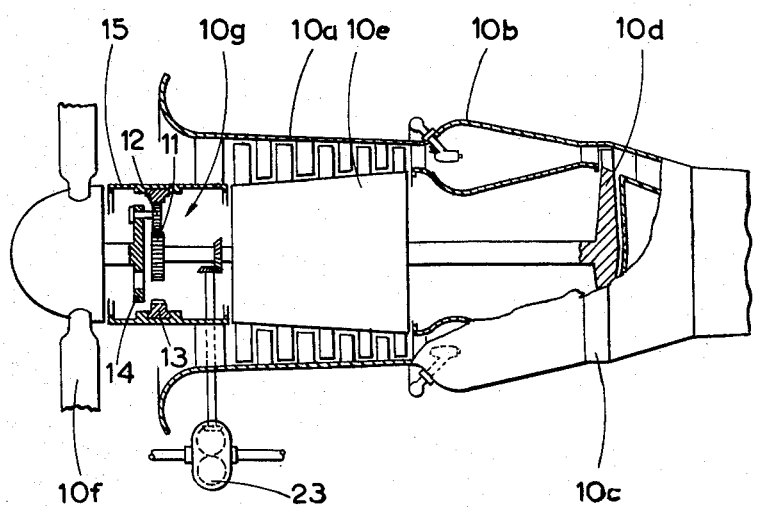

Oct. 11, 1960 A. A. LOMBARD 2,955,658
CONTROL SYSTEMS

Filed May 3, 1957 4 Sheets-Sheet 1

Inventor by Adrian Albert Lombard
Beech and Radu
Attorneys

Oct. 11, 1960

A. A. LOMBARD 2,955,658

CONTROL SYSTEMS

Filed May 3, 1957

4 Sheets-Sheet 3

Inventor
Adrian Albert Lombard
by
Leech and Radice
Attorneys

United States Patent Office 2,955,658
Patented Oct. 11, 1960

2,955,658

CONTROL SYSTEMS

Adrian Albert Lombard, Quarndon, England, assignor to Rolls-Royce Limited, Derby, England, a British company Filed May 3, 1957, Ser. No. 656,813

Claims priority, application Great Britain May 11, 1956

10 Claims. (Cl. 170—135.72)

This invention relates to control systems, and is particularly concerned with control systems for variable-pitch propellers driven by the engines of aircraft.

According to this invention, a control system for a variable-pitch propeller driven by an engine of an aircraft includes means sensitive to reverse torque of the propeller-engine combination, and a mechanical linkage between said torque-sensitive means and a valve in the propeller control circuit and arranged on sensing of reverse torque to operate the valve to feather the propeller.

The control system for a variable-pitch propeller of an aircraft engine usually comprises a constant speed unit, and according to a preferred feature of this invention the mechanical linkage may be connected to the valve of the constant speed unit to operate it to feather the propeller.

Alternatively the mechanical linkage may be connected to a feathering valve, which is separate from the constant speed unit where the latter is provided.

According to another feature of the invention, the mechanical linkage may be connected to the throttle control of the engine, to be rendered inoperative when the control is moved to select a low power, such as idling power, of the engine. In certain arrangements the throttle control may be connected to the speed-setting means of the constant speed unit in addition to being connected to the engine throttle valve. The linkage will be operative under cruising power and take-off power conditions.

According to yet another feature of the invention, the means sensitive to reverse torque of the propeller-engine combination may comprise a torquemeter device having a reaction member which is resiliently restrained by a liquid load or otherwise under positive torque conditions and which has an abutment which abuts a stop under negative torque conditions. Those skilled in the art will appreciate that positive torque occurs when the engine is driving the propeller, and negative torque when the propeller is wind-milling, i.e., being driven by the airstream due to the motion of the aircraft.

The mechanical linkage may include a pivoted lever against which the abutment on the reaction member presses under negative torque conditions, thereby to operate the valve in the propeller control circuit, at least under cruising power and take-off power conditions.

The invention avoids the use of hydraulic or electrical components in the linkage between the torque-sensitive means and the propeller control circuit, and provides a reliable means for feathering the propeller of an aircraft engine after failure thereof, thereby increasing the safety of operation of the aircraft.

Figure 2:
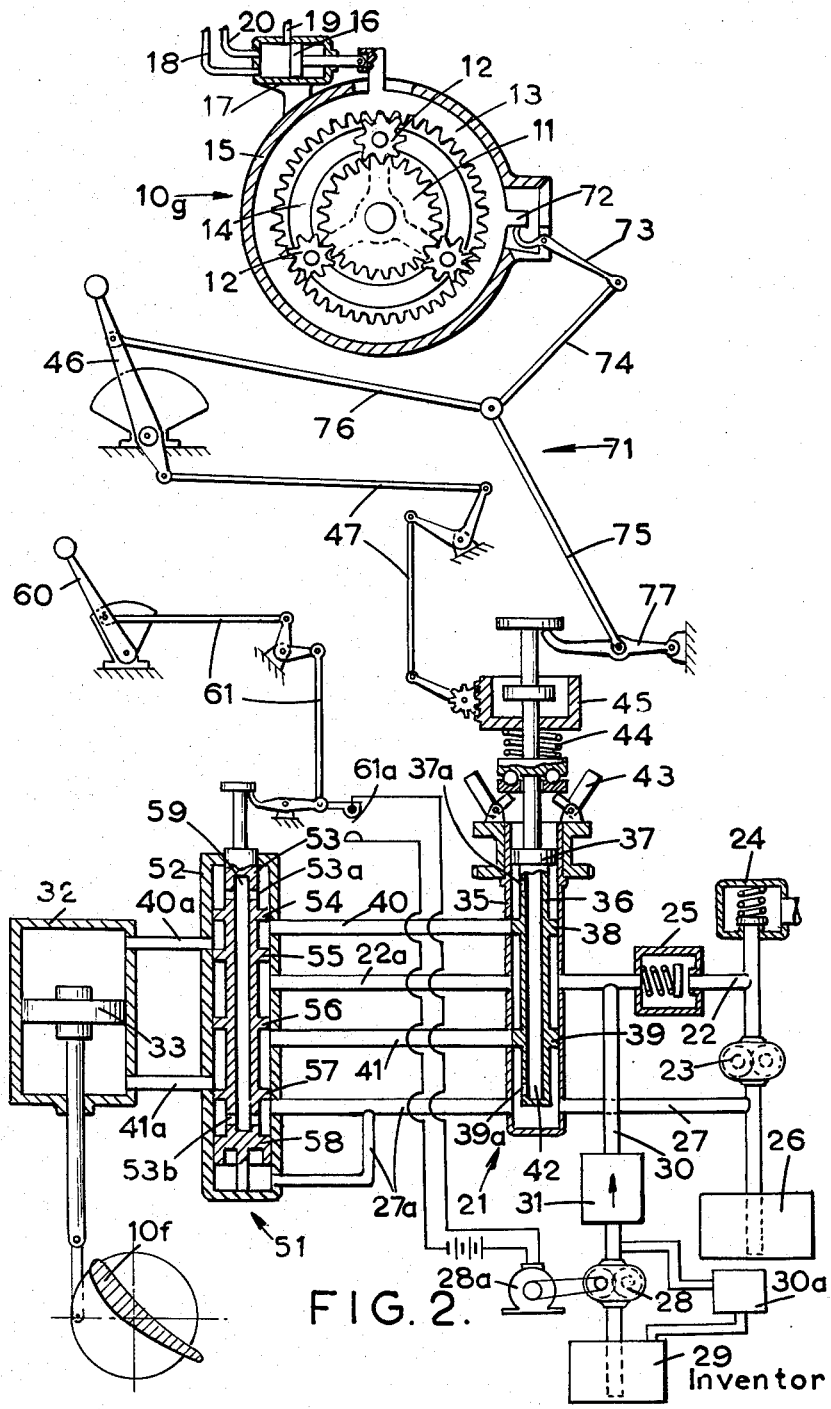
Figure 3:
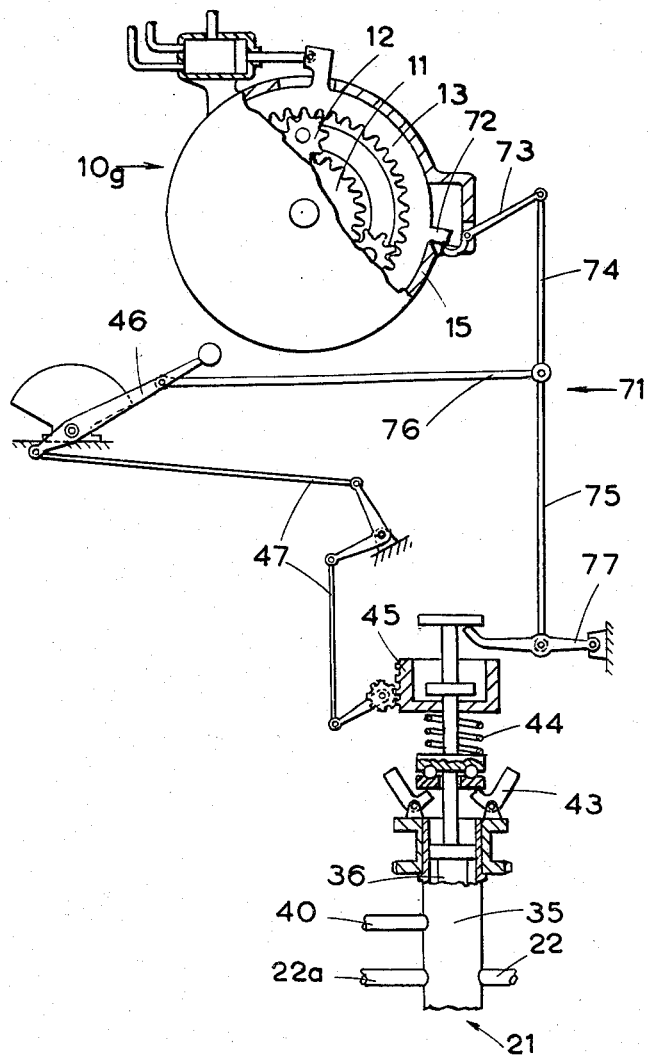
Figure 4:
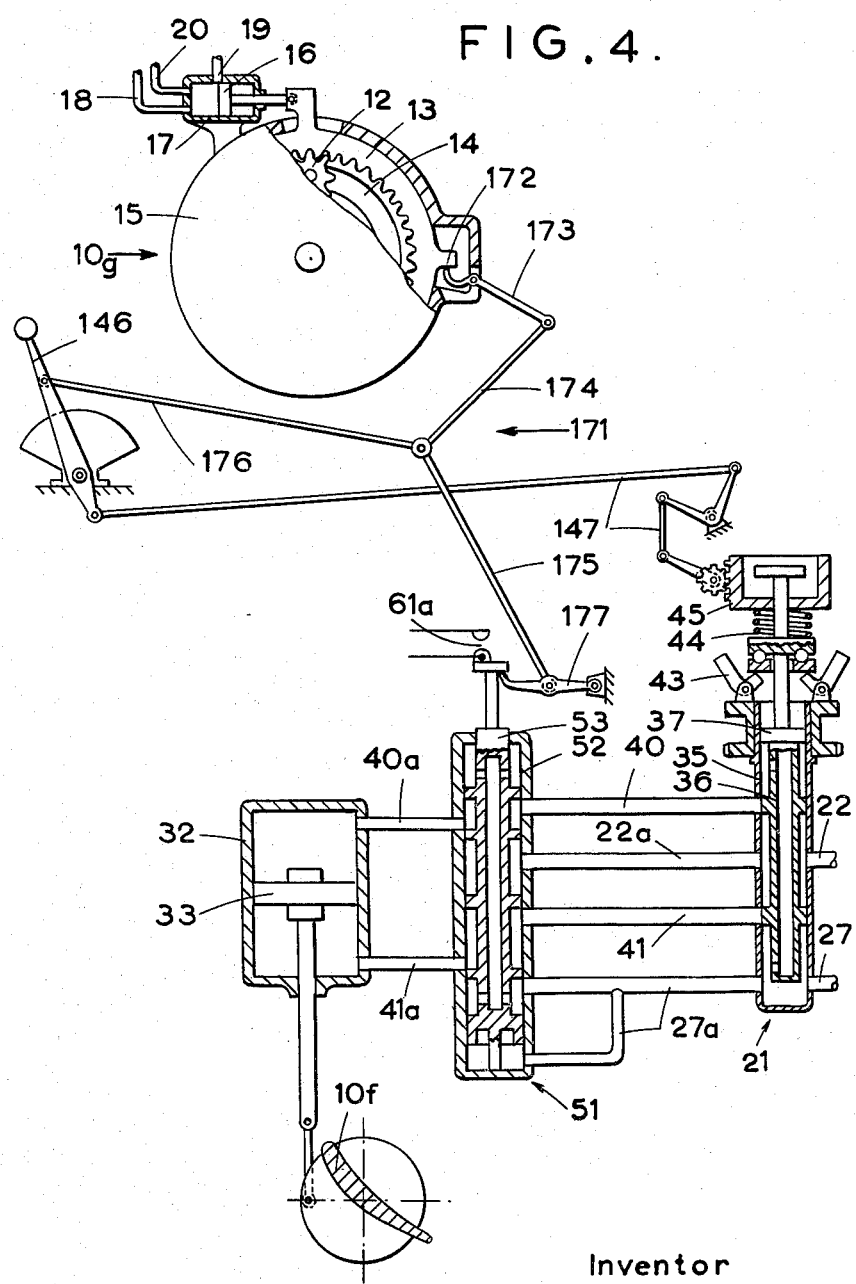

Two embodiments of this invention will now be described by way of example, with reference to the accompanying drawings, of which:

Figure 1 shows diagrammatically a propeller-driving gas turbine engine for aircraft propulsion in accordance with the invention, Figure 2 shows one embodiment in diagrammatic form, Figure 3 shows part of the embodiment of Figure 2 with parts in different positions, and Figure 4 shows a second embodiment in diagrammatic form.

Referring to Figure 1 the gas turbine engine comprises a multi-stage axial-flow compressor 10a which delivers air to combustion equipment 10b where the fuel is burnt in it, the products of combustion expanding through a turbine 10c. The rotor 10d of the turbine is connected to the compressor rotor 10e to drive it, and in addition the turbine 10c drives a propeller 10f through a reduction gear indicated generally at 10g.

Referring now to Figure 2, the reduction gear 10g comprises a sun gear 11 connected to the engine shaft and meshing with planet gears 12, which in turn mesh with an annular gear 13. The planet gears are supported in a planet carrier 14, which is connected to the propeller shaft. The annular gear 13 is mounted for limited rotation in the engine casing 15, and the torque reaction is transmitted to the casing through a torque-meter device of well-known kind, shown as comprising a piston 16 connected to the gear 13 and sliding in a cylinder 17. The torque reaction is opposed by the pressure of oil in the cylinder, the oil being supplied under pressure through pipeline 18 and the pressure in the cylinder being determined by the co-operation of the piston 16 and an outlet port leading to drain pipeline 19. The pipeline 20 leads to a pressure gauge. It will be understood that the pressure within the cylinder 17 is a measure of the torque developed by the engine.

The propeller pitch is controlled in the following manner:

There is provided a unit shown generally at 21, which is commonly known as a "constant speed unit," and which is continuously fed with oil under pressure through pipeline 22 from pump 23 which is driven by the engine as shown in Figure 1, the pressure in the pipeline 22 being controlled by a relief valve 24 and there being also provided a non-return valve 25. The pump 23 draws oil from tank 26, and there is also provided a return oil line 27 from the constant speed unit to communicate with the tank.

Moreover, there is also provided a further pump 28, which draws oil from a separate source 29 and delivers it to pipeline 22, downstream of non-return valve 25, under certain circumstances. The pump 28 delivers through a conduit 30 containing a second non-return valve 31, the pressure in the conduit 30 being controlled by a relief valve 30a. This pump is driven by an electric motor 28a which is energised when it is required to feather the propeller, so as to augment pump 23.

The constant speed unit controls the flow of oil from pipe-line 22 to the two ends of a cylinder 32 containing a piston 33 which is connected to the propeller blades 10f to vary their pitch. Downward movement of piston 33 in the drawings moves the blades to coarse pitch, and upward movement moves the blades to fine pitch.

It will be seen that the constant speed unit 21 comprises a ported housing 35 having within it a landed valve member 36. The housing 35 has the pressure oil pipeline 22 connected to it near its mid-length, and also has connected to it at the same point a pipeline 22a, which thus forms a continuation of the pipeline 22.

The valve member 36 has three spaced lands 37, 38, 39 of which one 37 closes off the top end of the housing 35, the second land 38 co-operates with a port in the housing 35 leading to the coarse pitch pipeline 40, and the remaining land 39 co-operates with a port leading to the fine pitch pipeline 41. The valve member 36 also has a passage 42 through it so that the space within the housing 35 between lands 37 and 38 communicates with the space below land 39 which is connected to return pipeline 27, through passage 42 and holes 37a and 39a.

The position of the valve member 36 in the housing 35 is normally determined by the loads exerted by a flyweight device 43, which is driven by the engine, and by a spring 44 the latter having a moveable abutment 45 the position of which is controlled by the setting of throttle lever 46 through linkage 47. If it is assumed that the device is in the equilibrium position, as shown in the drawing, an increase of engine speed will raise the valve member 36 in the housing 35 and cause oil to pass into the coarse pitch pipeline 40, whence it will pass into the top end of the cylinder 32, as seen in the drawing, to cause the pitch of the propeller to coarsen and restore the equilibrium speed. Likewise a decrease of engine speed will result in a reduction of the propeller pitch. It will be understood that oil from the end of the cylinder 32 other than that to which oil is supplied will return to the tank 26 by way of the fine or coarse pitch pipeline 41 or 40 respectively and the return oil line 27.

Interposed between the constant speed until 21 and the cylinder 32 is a feathering unit 51, which also comprises a ported housing 52 having within it a valve member 53. This valve member has five lands and it will be seen that the top land 54 is normally just above the port connected to the coarse pitch line 40, and the next land 55 is just below the port which communicates with pipeline 40a leading to the top end of cylinder 52. Thus pipeline 40a normally forms a continuation of the coarse pitch pipeline 40. Moreover, the central land 56 normally lies just above the port connected to the fine pitch line 41, and the fourth land 57 is just below the port which communicates with the pipeline 41a leading to the bottom end of cylinder 32. Thus pipeline 41a normally forms a continuation of the fine pitch pipeline 41. The bottom land 58 merely serves as a guide, and the space above the top land 54 is connected through a passage 59 to the space between lands 57 and 58 constituted by the hollow interior of valve member 53 and holes 53a and 53b, which in turn together with the space below land 58 is connected through pipelines 27a to the bottom end of housing 35 so as to be in communication with return pipe 27.

The pipeline 22a is connected to housing 52 about midway between lands 55 and 56; it will thus be seen that if the valve member 53 is raised relative to housing 52 by about twice the width of a land, the continuation 22a of pressure oil pipeline 22 is placed in communication with pipeline 40a, the normal coarse pitch and fine pitch pipelines 40, 41 are closed, and the pipeline 41a, which is connected to the bottom end of cylinder 32, is placed in communication with the return pipeline 27a. This raising of valve member 53 may be achieved by movement of the operator's lever 60 through the medium of linkage 61; such movement of lever 60, which may be referred to as the "manual feathering lever," closes contacts 61a thus energising the electric motor 28a driving pump 28, and accordingly the increased supply of pressure oil causes rapid coarsening of the propeller until the feathered position is reached at the end of the travel of piston 33.

In accordance with the invention in this embodiment, there is provided a connection, generally indicated at 71, between the reduction gear 10g and the constant speed unit 21. There is provided an abutment 72 on the annular gear 13 which withstands the torque reaction, and this co-operates with one end of a lever 73 which is centrally pivoted on the casing 15 and has its other end pivotally connected to a link 74. The lever may have a velocity ratio of 10, so that movement of abutment 72 is magnified ten times in link 74. The link 74 is in turn pivotally connected to a further link 75, and at the same point to a link 76. The link 75 is connected to a lever 77 which has its free end engaging with a flange on the valve member 36, and the link 76 is connected to the throttle lever 46. It will be apparent that when the throttle lever 46 is in the cruising range, as shown in Figure 2, the linkage 74, 75 is of cranked form, and moreover when the abutment 72 moves to its extreme position in the clockwise direction in the figure, as would occur under negative torque conditions, the lever 73 is rocked, lifting the linkage 74, 75 (while the link 76 swings about its point of connection with the throttle lever 46) and thus rocking lever 77 and lifting valve member 36 relative to housing 35. This in turn causes the pressure line 22 to be connected, via coarse pitch line 40 and extension 40a, to the top end of cylinder 32 and causes the propeller to be feathered. Moreover, this movement of abutment 72 may be arranged to energise the electric motor 28a driving pump 28, so that the pressure in line 22 is increased and the feathering occurs more rapidly.

However, when the throttle lever 46 is in the idling position, as shown in Figure 3, the linkage 74, 75 is substantially straight which lifts the outer end of lever 73, and thus the abutment 72 is permitted to move to its limiting position, as shown, without any effect on valve member 36.

In this way, when reverse torque, or "windmilling" of the propeller, occurs under idling conditions, as it often does for example when the aircraft is descending, there is no effect on the pitch change mechanism which continues for example under the control of the constant speed unit. However, if reverse torque occurs under conditions of cruising flight, or on take-off, due for example to an engine failure, the propeller is rapidly and automatically feathered through the connection 71, and the high drag associated with a windmilling propeller under these conditions is avoided. Such a drag may be dangerous, particularly for example if it occurs in an aircraft having two or four engines disposed symmetrically on either side of the fuselage, as is usual, because it sets up a large yawing couple.

In the modification shown in Figure 4, the reduction gear and the propeller control circuit are exactly as in the previous arrangement, and the same numerals denote the same parts. In this modification, however, there is provided a connection, indicated at 171 (corresponding to 71 in Figures 2 and 3) between the reduction gear 10g and the feathering unit 51, either instead of (as shown) or in addition to the manual feathering device 60, 61. The connection 171 includes an abutment 172 on the annular gear 13, a pivoted lever 173, links 174, 175 and lever 177 (corresponding to parts 72, 73, 74, 75, 77 of Figure 2) but in this case the lever 177 engages the valve member 53 of the feathering unit 51.

The throttle lever 146 is connected to operate abutment 45 through linkage 147, and is connected to the junction of links 174, 175 by means of link 176. The operation is similar to that of Figures 2 and 3, except that under negative torque conditions at take-off or cruising throttle setting the valve member 53 is raised by linkage 171, thus connecting extension 22a of pressure pipeline 22 to the top side of piston 33 via pipeline 40a; moreover under negative torque conditions electrical contacts 61a are made thus energising the electric motor 28a which drives pump 28 thereby increasing the pressure in pipeline 22.

It will be appreciated that, while the linkage 74, 75 or 174, 175, may not always consist of two links as shown, it will be kept relatively short while the linkage 76 or 176, although shown for convenience as a single link, will contain a relatively large number of links, depending on the distance between the operator's station or pilot's cockpit and the engine. The friction in such a linkage 76, 176, in addition to that of the lever 46 or 146, will ensure that no movement of the throttle lever 46, 146 occurs when the lever 73, 173 is rocked.

I claim:

1. In an aircraft, in combination, a power-plant having a pilot-operated throttle lever; a variable pitch propeller having fluid actuated servo-motor means for increasing and decreasing the pitch of the blades and including a source of pressure fluid, a control circuit and a valve so arranged that when displaced in one direction operates to supply said fluid to said servo-motor to feather the propeller blades; reduction gearing interconnecting the power-plant and the propeller and including reaction means sensitive to and movable by reverse torque of the propeller power-plant combination; a system of direct mechanical links connecting said valve and reaction means so as to displace the valve in said direction when said reaction means moves in response to reverse torque and a further link so connecting said throttle lever and said link system as to render the system incapable of moving said valve in said direction when the throttle lever is moved to low power and idling settings.

2. The combination defined in claim 1 in which said link system includes two links, means pivoting said links together and to said further link, the arrangement being such that movement of the throttle lever toward idling position decreases the angle included between the links of said pair.

3. In an aircraft, in combination, a power plant having a pilot-operated throttle lever, a variable pitch propeller having fluid actuated servo-motor means for increasing and decreasing the pitch of the blades and including a source of pressure fluid, a constant speed unit including a valve for controlling the supply of said fluid to said servo-motor means, a governor driven by the engine and normally in direct control of said valve to coarsen the propeller pitch when the engine speed increases and vice versa, means between the power plant and propeller movable by the action of reverse torque of the power plant propeller combination, a system of mechanical linkage directly between said last mentioned means and said valve and arranged to open said valve wide in the pitch coarsening direction when reverse torque occurs and further linkage so connecting said throttle lever and said system of mechanical linkage as to render the system incapable of moving said valve in said direction when the throttle lever is at low power and idling settings.

4. The combination as claimed in claim 3 in which a second valve is provided for said servo-motor means so arranged that on displacement in one direction the propeller is feathered, and pilot actuated means in control of said second valve.

5. The combination as claimed in claim 3 in which there is means actuated by movement of the throttle lever towards a higher engine speed position arranged to increase the speed setting of said governor.

6. The combination as claimed in claim 3 in which there is means actuated by movement of the throttle lever toward a lower engine speed position arranged to progressively decrease the effect of said mechanical linkage on said valve.

7. The control means as claimed in claim 1 in which the means sensitive to reverse torque of the power-plant propeller combination includes a torque meter device having a reaction member, liquid load means arranged to restrain said member under positive torque conditions, and a position stop for said reaction member under negative torque conditions to limit the load on said series of links.

8. The system as defined in claim 1 in which means is provided to augment said source of pressure fluid, an electric motor to drive said means and a circuit closer for said motor adapted to be actuated simultaneously with said movement of said valve so as to provide rapid movement of said servo-motor.

9. In an aircraft, in combination, a power-plant having a pilot operated throttle lever; a variable pitch propeller; reduction gearing interconnecting the power plant and the propeller and including reaction means sensitive to and movable by reverse torque; said propeller having fluid actuated servo-motor means for increasing and decreasing the pitch of the propeller blades, and including a source of pressure fluid, a control circuit, a valve in said control circuit, a power-plant driven speed governor in control of said valve to adjust the propeller pitch for constant speed, a second valve in said circuit which operates on displacement in one direction to coarsen the propeller pitch, a rigid mechanical linkage connecting said second valve to said reaction means to move said second valve in said one direction to feather the propeller on the occurrence of reverse torque, and a further link so connecting said throttle lever and said linkage as to render the linkage incapable of feathering the propeller when the throttle lever is in a low power or idling setting.

10. The construction according to claim 9 wherein a circuit is closed when said second valve is actuated and a secondary source of pressure fluid actuated by said circuit.

References Cited in the file of this patent

UNITED STATES PATENTS

| | | |
|---|---|---|
| 2,529,085 | Kochenburger | Nov. 7, 1950 |
| 2,595,345 | Engelhardt et al. | May 6, 1952 |
| 2,605,849 | Bordelon | Aug. 5, 1952 |
| 2,616,507 | Greenland | Nov. 4, 1952 |
| 2,628,684 | Slatter et al. | Feb. 17, 1953 |
| 2,644,534 | Jensen | July 7, 1953 |
| 2,801,701 | Coar | Aug. 6, 1957 |
| 2,802,335 | Skellern | Aug. 13, 1957 |

FOREIGN PATENTS

| | | |
|---|---|---|
| 145,530 | Australia | Mar. 30, 1950 |